United States Patent [19]
Oder

[11] Patent Number: 5,790,097
[45] Date of Patent: Aug. 4, 1998

[54] CONTROL DEVICE THAT CAN BE USED TO DESIGNATE AND MOVE AN OBJECT ON A SCREEN

[75] Inventor: H. Engin Oder, Voisins le Bx, France

[73] Assignee: Sextant Avionique, Velizy Villacoublay, France

[21] Appl. No.: 588,610

[22] Filed: Jan. 19, 1996

[30] Foreign Application Priority Data

Feb. 6, 1995 [FR] France .................... 95 01424

[51] Int. Cl.$^6$ .................... G09G 5/08
[52] U.S. Cl. .................... 345/157; 345/156
[58] Field of Search .................... 345/156, 157, 345/160, 161, 163, 167; 74/471 XY; 341/20

[56] References Cited

U.S. PATENT DOCUMENTS

| | | | |
|---|---|---|---|
| 4,680,577 | 7/1987 | Straayer et al. | 345/160 |
| 4,879,556 | 11/1989 | Duimel | 345/156 |
| 4,931,781 | 6/1990 | Miyakawa | 345/160 |
| 5,327,162 | 7/1994 | Soma | 345/161 |
| 5,400,054 | 3/1995 | Dorst | 345/167 |
| 5,479,191 | 12/1995 | Komatsu | 345/161 |
| 5,539,478 | 7/1996 | Bertram et al. | 345/167 |
| 5,565,891 | 10/1996 | Armstrong | 345/167 |

FOREIGN PATENT DOCUMENTS

| | | |
|---|---|---|
| 39 13 648 C1 | 4/1986 | German Dem. Rep. |
| 9300067 | 1/1993 | Netherlands . |

*Primary Examiner*—Richard A. Hjerpe
*Assistant Examiner*—Kent Chang
*Attorney, Agent, or Firm*—Browdy and Neimark

[57] ABSTRACT

The control device embodying the invention comprises an operating disk that is mobile in all directions within a plane, a detection unit comprising four strain gauges leaning against said disk in two opposite couples of locations situated on two perpendicular axes, and a processing circuit capable of measuring the strains exerted in said plane on the strain gauges by the operating disk and which works out a command as a function of the amplitude of the strains detected by the strain gauges. The invention applies to the designation and moving of an object on a screen.

10 Claims, 2 Drawing Sheets

CONTROL DEVICE THAT CAN BE USED TO DESIGNATE AND MOVE AN OBJECT ON A SCREEN

BACKGROUND OF THE INVENTION

1. Field of the Invention

This invention relates to a control device that can be used to designate and move an object on a screen.

2. Description of the Prior Art

Generally, it is known that this type of command is usually performed by means of a set of four keys or similar devices aligned two by two on two respective perpendicular axes (upper, lower, right and left keys).

Experience has proved that this solution has a certain number of drawbacks.

Firstly, it does not enable diagonal motion to be performed. As a result of this, in most cases, the operator must perform a series of moves parallel to said axes before reaching his objective.

Moreover, this solution does not enable the operator to have efficient and ergonomic control over the speed of displacement.

Indeed, in conventional solutions, the speed of displacement increases as a function of the length of time the key is acted upon.

Thus, to perform slow displacements, the operator must carry out a series of short presses on the key, and this is not practical.

Conversely, to achieve fast displacement, he must keep the key pressed in. In this way, contrary to all logic, at the start of motion, the movement is performed slowly without any accuracy being required. On the other hand, the nearer one gets to the objective and therefore the more accurate the motion should be, the faster the speed of displacement becomes.

It is for this reason that it is practically impossible to reach, by means of a single pressing of a key, an objective requiring considerable displacement (multimotion).

Thus, over and beyond its poor ergonomics, this solution has the drawback of not enabling the objective acquisition time to be optimized.

The solution consisting in using a mouse instead of the keys is ergonomically better. However, it cannot be used in numerous applications, notably due to the fact that the mouse is an object that is separate from the case of the unit to which it is connected via a flexible link, and that, in addition, it requires a sizeable area (rolling area) for utilisation thereof.

Further solutions, such as a trackball, lack accuracy and do not enable the speed of displacement to be controlled efficiently and ergonomically.

Furthermore, it is difficult to use devices of this type in a perturbed environment (vibrations) and to make them tight.

OBJECT OF THE INVENTION

The main object of this invention is to remedy the preceding disadvantages, particularly to provide a control device devoid of the above-mentioned drawbacks and which is therefore tight, compact, and can be integrated into a control panel of a device as a key would be, that can be manipulated easily and ergonomically and that enables coherent control of the speed of displacement in order to reduce the time required to acquire the objectives, by increasing control accuracy.

SUMMARY OF THE INVENTION

Accordingly, there is provided a control device comprising an operating part guided by a guiding means so as to be capable of moving in all directions within a plane, a detection unit comprising four detection means leaning against said part by way of two couples of opposite locations situated on two perpendicular axes, and a processing circuit capable of measuring the strains exerted in said plane on the detection means by the operating part and which commands the orientation, direction and speed of displacement as a function of the amplitude of the strains detected by the detection means.

The invention is not limited to any particular means of detection, and the latter can be of the capacitive, resistive, magnetic, optical type, etc.

This detection means can also consist of strain gauges. In this case the operating part can, within said plane, be in the shape of a circle inscribed within a square formed by four flexible blades each bearing a strain gauge.

A switch, or even a strain gauge, can also be provided to detect strains exerted on the operating part, perpendicularly to said plane.

These arrangements enable a very compact control device to be obtained, of dimensions that can be smaller than the four conventional direction keys, yet providing better ergonomics and enabling better accuracy of control to be obtained.

BRIEF DESCRIPTION OF THE DRAWINGS

Further features and advantages of the invention will be apparent from an embodiment of the invention described, by way of a non-limiting example, in reference to the corresponding accompanying drawings in which.

DESCRIPTION OF THE PREFERRED EMBODIMENTS

Figure 1:
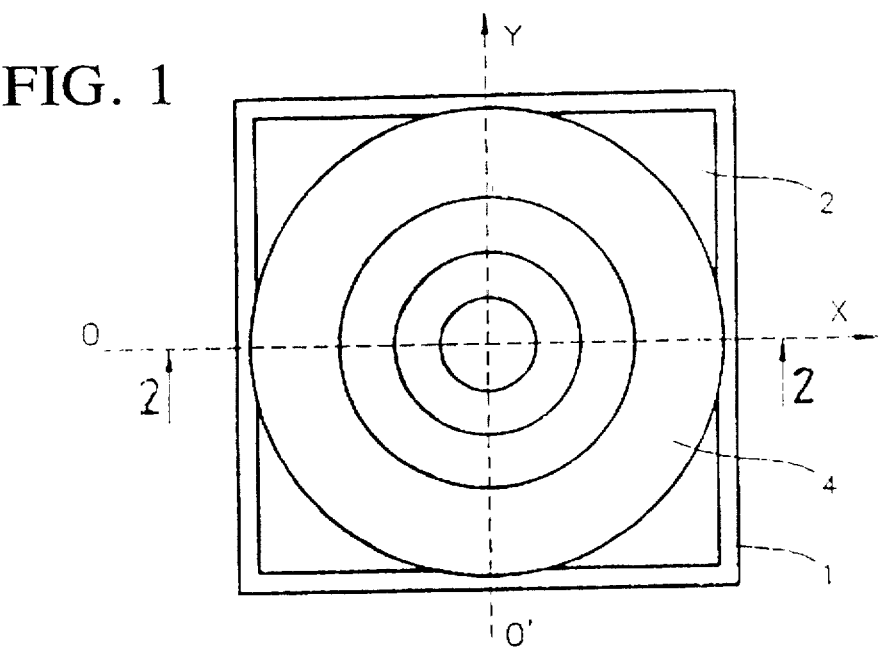
FIG. 1 is a front view of the control device.
Figure 2:
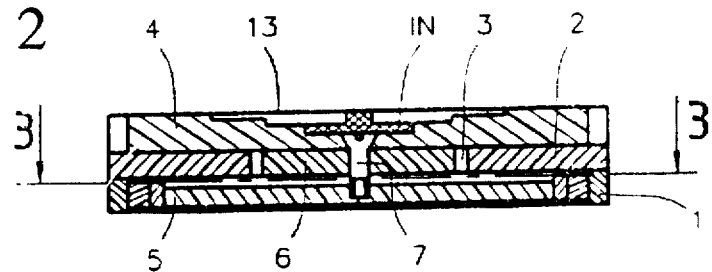
FIG. 2 is a sectional drawing along line 2 in FIG. 1.
Figure 3:
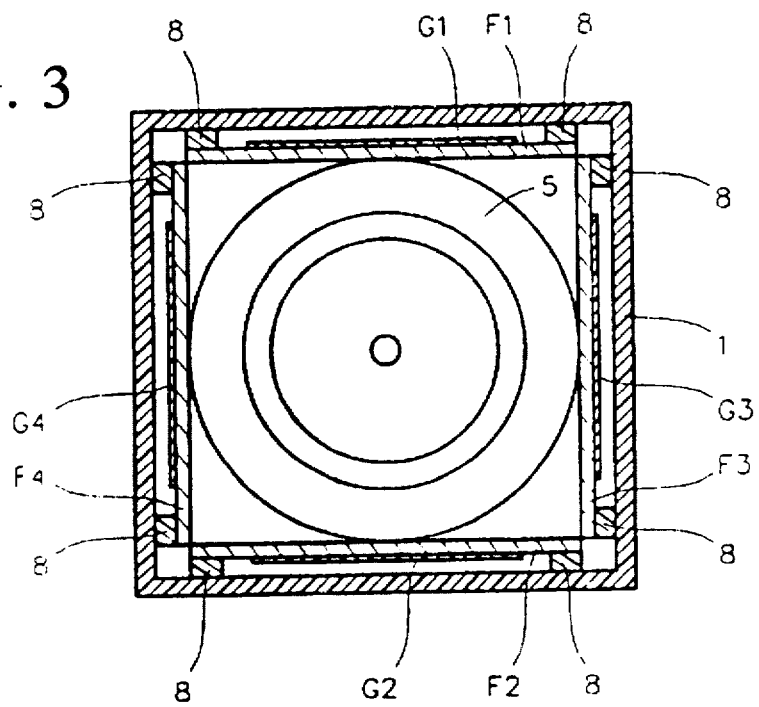
FIG. 3 is a sectional drawing along line 3 in FIG. 2.

As represented in FIGS. 1 to 3, the control device comprises a fixed structure in the form of a square-shaped frame 1 onto the upper side of which is attached a wall 2, also square-shaped, comprising a circular-shaped central orifice 3.

Onto the wall 2 is slidably mounted a circular-shaped key 4 connected to a coaxial disk 5 contained within the frame 1 by means of a coaxial circular brace 6 extending through the orifice 3, attachment with the disk 5, brace 6 and key 4 being made integral by means of a coaxial screw 7. The diameters of the key 4 and disk 5 are greater than that of the orifice 3 which, in turn, is greater than that of the brace 6. The width of the available space between the key 4 and the disk 5 is provided slightly greater than the thickness of the wall 2.

The mobile assembly comprised of the key 4, disk 5 and brace 6 is maintained centered in relation to the frame 1 by means of four flexible blades arranged parallel in twos $F_1$–$F_2$, $F_3$–$F_4$ tangentially against the disk 5. These blades define a square in which the disk 5 is inscribed.

In fact, each of these flexible blades $F_1$ to $F_4$ is attached to an inner side of the frame 1 through the intermediary of two spacing shims 8.

To each of these flexible blades $F_1$ to $F_4$ is secured, e.g. by bonding, a strain gauge $G_1$ to $G_4$.

Figure 4:
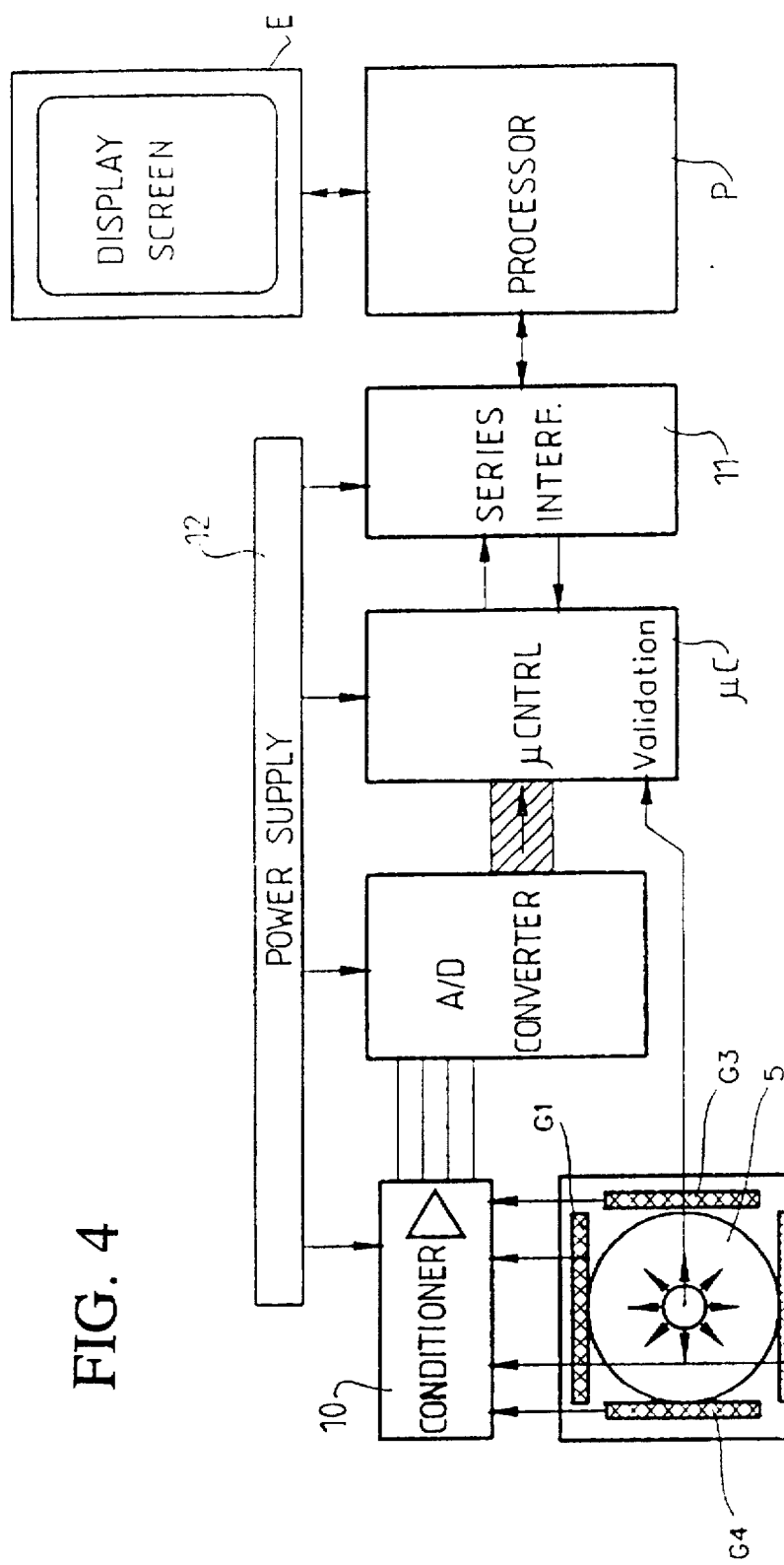
FIG. 4 is a synoptic diagram of an electronic processing circuit associated with the control device.

The processing circuit associated with the strain gauges can comprise, e.g. as represented in FIG. 4, a conditioner 10 which receives the data issued by the strain gauges $G_1$ to $G_4$ and transmits them to a microcontroller µC via an analog-to-digital converter A/D. As for the microcontroller, it can be connected, e.g. by means of an RS232 type serial communications interface 11, to the processor P associated with the screen E in respect of which object displacement management is required (or even the displacement of the entire image). The power to the electronic circuits of the conditioner 10, analog-to-digital converter A/D, microcontroller µC and interface 11 are, of course, supplied by a stabilized feed circuit 12.

The conditioner 10 conditioning the signals from the strain gauges $G_1$ to $G_4$ is designed so as to transform the variations in the resistance of the gauges $G_1$ to $G_4$ into analog electric signals. It can notably comprise four Wheatstone bridges each comprising a branch constituted by a corresponding strain gauge.

The analog-to-digital converter A/D samples off and converts the analog signals transmitted by the conditioner 10 into digital signals that can be used by the microcontroller.

The microcontroller µC receives, on the one hand, the sampled off and digitalized signals coming from the converter A/D, and, on the other hand, the control law configuration commands.

It sets up codes from the control laws and from the signals acquired from the strain gauges, and then transmits them via the interface to the processor P managing the screen E.

The RS232C type series interface 11 enables two-way duplexed communication with the processor P.

From the mechanical point of view, the strains exerted on the key 4, in a plane parallel to the plane B—B, tend to displace the disk 5 by causing deformation of the elastic blades $F_1$ to $F_4$ and, therefore, of the strain gauges $G_1$ to $G_4$. The components of these strains on the respective axes OX and O'Y are therefore detected by the variation in the resistance of the gauges. When no strain whatsoever is applied on the key 4, the flexible blades $F_1$ to $F_4$ associated with the gauges return the disk 5 to the idle position (centered within the frame).

The control laws used by the microcontroller µC serve to convert the value of the signals from the gauges $G_1$ to $G_4$ into motion command codes. These laws, which are in the form of conversion tables, can be dynamically modified by the microcontroller µC by means of the protocol for communication with the processor P via the series link 11, through configuration commands recognized by the microcontroller µC.

Figure 5:
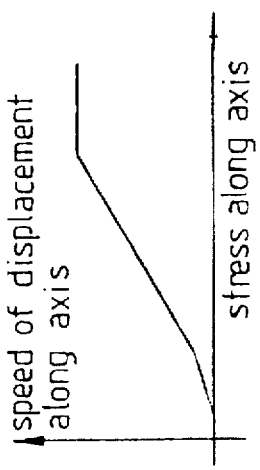
FIG. 5 is a diagram illustrating the law governing the control of an actuator (speed of displacement=f (force along the axis)).

FIG. 5 shows an example of a law according to which the speed of displacement initially increases in a substantially linear manner as a function of the stress applied to the key 4 in the sensitive axis of the strain gauge $G_1$ to $G_4$ (perpendicular to the gauge and situated in the plane of displacement of the disk 5), and then maintains itself at a constant value irrespective of the strain applied to the gauge $G_1$ to $G_4$.

The microcontroller µC generates the displacement codes, as a function of these control laws, for transmission to the processor P.

Two operating modes can be envisaged for this purpose, namely temporal incrementation and pulse amplitude coding.

According to the temporal incrementation mode, the strain applied is translated into a series of direction codes of which the frequency of repetition is proportional to the strain component in the corresponding direction.

In this case, the conversion flow is important, to the detriment of the control flow. Unlike speed, resolution is not very important.

In the pulse amplitude coding mode, the codes transmitted contain information relating to both the direction and the amplitude of displacement.

For instance, the coding on a byte could be as follows:
AXXXBYYY
A=1 meaning displacement to the left by XXX points
A=0 meaning displacement to the right by XXX points
B=1 meaning downwards displacement by YYY points
B=0 meaning upward displacement by YYY points In this mode, the frequency of transmission of the codes is constant but can be modified by the processor P.

In its basic function, the device previously described can perform the functions of the mice used on standard microcomputers. The difference is that instead of moving the mouse, the operator need only use his finger to press the key 4 in the direction in which he wishes to achieve displacement. The programme residing in the processor can thus command the device in a manner compatible with standard mouse drivers. This enables the device to be used with standard software programmes and ensures compatibility with software developments.

The device previously described can further comprise a confirmation switch IN placed in such a way that activation thereof can only be achieved by exerting pressure on the key 4 according to an axis perpendicular to the disk 5.

In the example represented in the drawings, such a switch IN is disposed at the center of the key 4 and can be operated via a deformable membrane 13 extending on the front side of the key 4.

This switch IN is connected to the microcontroller µC which, when the switch is operated, detects the contact via one of its Boolean inputs.

This causes the microcontroller µC to transmit a confirmation code provided the control key 4 has not been acted upon laterally (parallel to the disk).

This function can also be performed by a strain gauge (fifth gauge) which detects vertical strains perpendicular to the plane, and a strain threshold detector that can be programmably adjusted, as can the control laws, which converts the vertical pressure exerted on the key into a validation pulse.

I claim:

1. A control device usable for designating and moving an object on a display screen, said device comprising:
    a fixed structure comprising a frame having one side provided with a wall having a central orifice,
    a mobile operating part slidably mounted on said wall outside said frame by means of a disk larger than said orifice and disposed parallel to said wall inside said frame, and a link connecting said operating part with said disk and passing through said orifice, said operating part being thus capable of moving with said disk in translation in all directions within a plane as a result of strains exerted parallel to said plane,
    four flexible blades parallel two by two defining a square in which said disk is inscribed, said disk bearing against said flexible blades, strain detection means for detecting strains exerted by said disk to each of said flexible blades in said plane, and a processing circuit connected to a display screen and to said detection means for measuring amplitudes of strains respectively exerted on said blades by said disk and detected by said detection means, and for controlling orientation, direction and speed of displacement of an object displayed on said display screen as a function said amplitudes of said strains detected by said detection means.

2. The control device as claimed in claim 1, wherein the detection means consists of strain gauges respectively fixed to each of said flexible blades.

3. The control device as claimed in claim 1, wherein said operating part is, within said plane, of circular shape inscribed within said square delimited by said four flexible blades.

4. The control device as claimed in claim 1, comprising a means, separate from said detection means, for detecting a strain exerted, perpendicularly to said plane, on said operating part.

5. The control device as claimed in claim 2, wherein said processing circuit comprises a conditioner which transforms resistance variations of said strain gauges into analog electric signals which, after being converted into a digital signal by an analog-to-digital converter, are applied to a microcontroller coupled to a processor managing said display screen.

6. The control device as claimed in claim 5, wherein said microcontroller works out motion command codes from control laws and digital signals acquired from said analog-to-digital converter.

7. The control device as claimed in clam 6, wherein said control laws used by the microcontroller are dynamically modified by means of a protocol for communication with said processor.

8. The control device as claimed in claim 1, wherein the strain applied to the detection means is translated into a series of direction codes with a repetition proportional to a component of the strain in the corresponding direction.

9. The device as claimed in claim 6, wherein the codes transmitted to said processor by said microcontroller contain information relating to both the direction and the amplitude of displacement of said object on the display screen.

10. The device as claimed in claim 1, wherein said operating part is fixed to said disk by means of a brace extending through said central orifice and made integral with said operating part and said disk.

\* \* \* \* \*